United States Patent Office 2,972,578
Patented Feb. 21, 1961

2,972,578

FOAM INHIBITED SOLUBLE OIL COMPOSITION

Lawrence A. Roehler, Harvey, Ill., assignor to Sinclair Refining Company, New York, N.Y., a corporation of Maine No Drawing. Filed Jan. 26, 1956, Ser. No. 561,666

17 Claims. (Cl. 252—33.3)

The present invention relates to new compositions of matter. More particularly, the present invention relates to novel compositions which are characterized by the property of destroying and inhibiting foam formation. Compositions of the present invention are gels comprising as the essential constituents a liquid organic medium, a wax and a defined polymer of ethylene, and soluble oils having these gels dispersed therein.

Metal working oils, such as soluble cutting oils, are frequently employed under conditions which include extreme agitation and high pressure application. The conditions cooperate to effect lubrication and cooling but disadvantageously produce foam. Foam can interfere with visual control of the operation being effected, can insulate the piece being worked from the cooling action which the lubricant otherwise exerts and can escape the immediate work area and result in unsatisfactory operating conditions. Accordingly it is frequently undesirable that foam, especially stable foam, be produced during metal working operations.

I have discovered a novel composition especially useful for destroying and suppressing foam. I have also discovered a soluble oil composition, including a defined additive, which is characterized by the ability to resist formation of and to destroy foam occurring in use. Compositions of the invention are gels comprising a liquid organic medium, a wax and a defined polymer of ethylene, and soluble oils having the gels dispersed therein.

The new gel compositions of the present invention can be prepared by adding the polymer and wax to the material which comprises the liquid organic medium together, or one at a time, heating with agitation at a temperature sufficient to effect solution and then rapidly cooling the mixture to obtain the gel. The temperature employed must be sufficiently high to insure that the polymer will melt; particularly satisfactory temperatures which can be employed include about 200 to 250° F. Higher temperatures also can be used; however, higher temperatures aggravate the problem of rapidly chilling the solution, and as rapid chilling is essential to the formation of the gel, higher temperatures are less desirable. Rapid chilling can be accomplished effectively by use of a stream of cold air impinging upon the composition while it is being agitated. Other methods, such as pouring the solution in a thin film over a cold surface, can also be employed depending upon choice of the operator and equipment available. A very advantageous method of producing these gels which has been developed for commercial scale production comprises putting about 25 to 75% of the organic medium into a kettle, adding all of the ethylene polymer to be employed and then heating the mixture to a temperature sufficient to melt the polymer, for example about 200 to 240° F. After the polymer is melted, up to about 50% of the remaining organic medium to be employed is added and the mixture immediately cooled to a temperature sufficient to solidify the polymer yet high enough to insure melting of the wax to be added; a temperature of about 170 to 190° F. and preferably 180° F. is satisfactory. This cooling can be accomplished by indirect heat exchange if needed. At this point the wax is added, preferably as a melt, the remaining organic medium then added and the mixture rapidly cooled down to at least about 120° F. by indirect heat exchange as, for example, by the external application of water to the kettle. A preferred range is about 90 to 120° F. The temperatures in this commercial procedure also are variable. That is, the temperature to which the mixture is cooled after addition of the polymer must only be low enough to insure solidification of the polymer while obtaining a satisfactory gel, still it must be high enough to insure dissolution of the wax which is then added. This mix is then cooled rapidly to a temperature which insures solidification of the wax.

The compositions of the invention are employed in lubricants in metal working operations, especially soluble cutting oils. Soluble cutting oils are well known commercial products generally comprising a refined lubricating oil base, a soap or other emulsifying agent and a common solvent and/or coupling agent, the materials being present in amounts such that a stable emulsion can be formed by the composition and 1 to 50 parts of water. Typical soluble oils comprise a lubricating oil base, about 25 to 40 weight percent of an emulsifier such as a sulfonate, naphthenate or oleate, about 3 to 7 weight percent of a secondary emulsifier such as sodium rosinate or analogous metal salt, and about 0.5 to 1.0 weight percent of a coupling agent such as Ethyl or Butyl Cellosolve (glycol ethyl ether or glycol butyl ether) or diethylene glycol. Additives such as bactericides and extreme pressure agents and the like also are frequently included to advantage.

For satisfactory service it has been found that compounding of the soluble oil and my new gel must be accomplished under certain defined conditions. For example, it has been found that the prepared additive will not function properly if it is incorporated in the soluble oil when the temperature of the soluble oil is greater than 150° F. Thus, as a practical matter, I disperse the additive in the soluble oil at a temperature of about 100° F. while mildly agitating, and temperatures of about 70° F. to 125° F. have been found to be particularly satisfactory. The most advantageous temperature to be employed is determined primarily by the quantity of additive used. For example, with about 3% additive a temperature of about 100° F. is most desirable while with 5% temperatures of about 120° to 125° F. appear to be optimum. The invention can also be practiced by dispersing the additive components directly into the soluble oil at temperatures of gel formation as mentioned above rather than preforming the additive composition and then adding it as such. In this instance also the use of high temperatures, that is above about 150° F. after the additive has formed should be avoided. The anti-foam additive is employed in soluble oils in an amount effective to inhibit formation of and destroy foam occurring in use. Generally about 0.05 to 20 weight percent of the additive, and particularly 3 to 7 weight percent, is employed, based on the resulting soluble oil-additive composition and depending upon the soluble oil used and the use contemplated.

The polymeric materials employed in the present invention are known articles of commerce. They are crystalline polymers of ethylene having a molecular weight of about 1500 to 2500. The polymers generally are used in amounts of about 1 to 10 weight percent of the composition, and preferably about 1 to 4 weight percent. In addition to the usual ethylene polymers, terminal hydroxyl-containing polymers of ethylene conforming to the preceding physical properties also can be used. In fact, the preferred polymers are terminal hydroxyl-containing polymers of ethylene having a molecular weight of about 2000 to 2200. In general, terminal hydroxyl-containing ethylene polymers are prepared by polymerizing ethylene at the usual conditions of temperature and pressure, that is at pressures from about 800 to 3000 atmospheres and temperatures from about 390 to 750° F., with or without a free radical forming catalyst such as hydrogen peroxide and in the presence of a hydroxyl-containing chain stopper such as isopropanol. Commercially available examples of satisfactory hydroxyl-containing polymers are Alcowax No. 6 and No. 7, available from Allied Chemical and Dye Company. Conditions for the preparation of these materials are well-known as is evidenced by U.S. Patents No. 2,504,400 and No. 2,683,141. By terminal hydroxyl-containing I intend to indicate that a hydroxyl radical is on one of the end 5 or 10 carbon atoms rather than being centrally located in the molecule; it is believed that the hydroxyl radical generally occurs on one of the end three carbon atoms.

The wax component which can be used in the present invention is an article of commerce produced from petroleum oils. While waxes occur in substantially all known crudes it is preferred to employ those obtained from Pennsylvania or paraffin base crude oils, which are generally found in the Northeastern section of the United States. Either crystalline paraffin wax or microcrystalline wax can be employed; however, while for foam depressing properties they appear to be functional equivalents, the storage stability and foam breaking property above 100° F. of compositions containing the microcrystalline wax are so much better than that which results upon use of crystalline paraffin wax that the former is preferred. Such preferred microcrystalline waxes generally are characterized by a large percentage of non-normal paraffins. Typical properties includee a melting point from about 122 to 132° F., a viscosity at 175° F. according to ASTM D445–52T of about 4 to 6 centistokes, a penetration at 77° F. of about 15 to 25 and a penetration at 90° F. of about 40 to 50.

The major portion of the novel gel compositions of this invention comprises a liquid organic medium, for example a suitable oil. Suitable oils are those of lubricating oil viscosity and preferably those having a viscosity at 100° F. ranging from about 50 to 150 SUS. Oils which are too light may result in bleeding in the resulting gels and those which are too heavy frequently render the gels difficult to disperse in soluble oils. The oils preferably are mineral base and can be obtained from any known crude. Particularly satisfactory oils include naphthenic base lubricating oil fractions having a viscosity of about 100 SUS at 100° F. Other suitable oils include kerosene, gas oils and other liquid mineral oil fractions. These petroleum oils can be replaced with other liquid organic mediums such as fatty oils, alcohols, polyamine, polyalcohol-polyethylene oxide condensation products, diester synthetic lubricants and so on, so long as a satisfactory gel results upon its use.

Thus typical compositions of the present invention include a gel composed, for example, of a liquid organic medium, about 2 to 10 weight percent of the wax and about 1 to 10 weight percent of ethylene polymer. A typical specific composition is a gel containing a naphthenic base lubricating oil fraction having a viscosity of 100 SUS at 100° F., 5 weight percent of a paraffin base microcrystalline wax having an AMP melting point of 128° F. and 2 weight percent of a polymer of ethylene having a molecular weight of 1800. In the soluble oil compositions, a typical specific composition is 5 weight percent of the above specific gel dispersed in a soluble oil consisting of a Mid-Content base lubricating oil having a viscosity at 100° F. of 125 SUS, 30 weight percent of sodium mahogany sulfonate, 5 weight percent of sodium rosinate and 2 weight percent of diethylene glycol. All percentages are by weight percent based on the resulting compositions, unless otherwise specified. While a gel is the specified and preferred physical state of use, the composition can be used as a liquid provided it has first been a gel.

In addition to the components of the gel compositions described, and of the soluble oils where employed, compositions of the invention can also contain other additives commonly employed in the art in the usual amounts so long as the foam depressing and foam breaking properties are not deleteriously affected. Such additives include antioxidants, wetting agents, extreme pressure agents, antistaining agents and so on.

The invention will be described further in connection with the following specific example. It should be understood that the details disclosed are not intended as limiting the invention.

EXAMPLE

Two pounds of a terminal hydroxyl containing polymer of ethylene having a molecular weight of 2100 and five pounds of paraffin base microcrystalline wax having an AMP melting point of 128° F. were added to a kettle containing about 93 pounds of a refined naphthenic base lubricating oil having a viscosity of about 100 SUS at 100° F. The resulting mixture was heated, with agitation, to about 240° F. and held at this temperature until the waxes were completely solubilized. The mixture was then rapidly cooled by being subjected to a high pressure stream of cold air until a gel formed.

About five pounds of the additive thus formed were added to a commercial soluble oil maintained at about 100° F. Properties of the soluble oil before and after the addition of the additive composition are tabulated below:

Table I

|  | Soluble Oil | Soluble Oil With Additive |
|---|---|---|
| Gravity, ° API | 21.8 | 21.0 |
| Flash, ° F | 320 | 340 |
| Fire, ° F | 380 | 370 |
| SUS at 100° F | 317.9 | 311.6 |
| SUS at 210° F | 50.63 | 50.11 |
| Pour, ° F | 5 | 10 |

The resulting soluble oil additive-containing compositions were then tested by using the modified ASTM foam test. Results obtained on emulsions made with 5 percent of soluble oil-additive mixture and 95 percent distilled water appear in Table II. For comparative purposes data are included in Table II for emulsions containing 5 percent of the same soluble oil and 95 percent distilled water but no additive.

Table II

|  | Temp., ° F. | Ml. Foam After Foaming 5 Min. | Ml. Foam After Settling 10 Min. | Collapse Time |
|---|---|---|---|---|
| Soluble Oil Emulsion | 75 | 260 | 180 | 10 Min. +. |
|  | 120 | 175 | 15 | 10 Min. +. |
|  | 150 | 235 | 0 | 7 Min., 17 Sec. |
| Soluble Oil Emulsion with Additive | 75 | 0 | 0 | 0 Min., 0 Sec. |
|  | 120 | 0 | 0 | 0 Min., 0 Sec. |
|  | 150 | 115 | 0 | 9 Min., 38 Sec. |

The effective inhibition of the formation of stable foam upon use of the present invention is readily apparent from the above data.

Twenty-four hour emulsion stability tests also were conducted and the results appear in Table III below. For comparative purposes data are included on emulsions made from (1) 5 percent of the soluble oil containing the additive and 95 percent of distilled water and (2) 5 percent of the soluble oil and 95 percent of distilled water but no additive.

Table III

|  | Dist. Water | 400 p.p.m. Water | 600 p.p.m. Water |
|---|---|---|---|
| Soluble Oil Emulsion. | 2 mm. Cream Ring. | 2 mm. Cream Cuff. | 3½ mm. Cream Cuff. |
| Soluble Oil Emulsion with Additive. | ----do-------- | 2½ mm. Cream Cuff. | Do. |

These emulsion stability data indicate that the addition of my anti-foam additive to the soluble oil has very little if any effect on emulsion stability and hence, the usual emulsifying characteristics of the soluble oil in which the additive is employed will be evidenced.

I claim:

1. A gel consisting essentially of a mineral oil of lubricating viscosity, about 2 to 10 weight percent of a petroleum microcrystalline wax and about 1 to 10 weight percent of a polymer of ethylene having a molecular weight of about 1500 to 2500.

2. The gel of claim 1 where the oil of lubricating viscosity is a mineral oil with a viscosity from about 50–150 SUS at 100° F.

3. A gel according to claim 1 in which the microcrystalline wax is derived from a paraffin base crude and has a melting point of about 122 to 132° F.

4. A gel according to claim 1 in which the polymer is a terminal hydroxyl-containing polymer of ethylene.

5. A gel according to claim 4 in which the polymer has a molecular weight of about 2000 to 2200 and is present in an amount of about 1 to 4 percent based on the composition.

6. A method for producing a gel containing a mineral oil of lubricating viscosity, about 1 to 10 weight percent of an ethylene polymer having a molecular weight of about 1500 to 2500 and about 2 to 10 weight percent of a petroleum microcrystalline wax, said method comprising heating the mixture, formed by adding the ethylene polymer to about 25 to 75 percent of the oil of lubricating viscosity, to a temperature sufficient to melt the polymer, adding up to about 50 percent of the remaining oil of lubricating viscosity, cooling the mixture to a temperature sufficient to solidify the polymer yet high enough to insure melting of the wax to be added, adding the wax to the mixture, adding the remaining oil of lubricating viscosity, and rapidly cooling the mixture to a temperature down to at least about 120° F.

7. A method for producing a gel containing a mineral oil of lubricating viscosity, about 1 to 10 weight percent of an ethylene polymer having a molecular weight of about 1500 to 2500, and about 2 to 10 weight percent of a petroleum microcrystalline wax, said method comprising heating a mixture, formed by adding the ethylene polymer to about 25 to 75 percent of the oil of lubricating viscosity, to a temperature at about 200 to 240° F. to melt the polymer, adding up to about 50 percent of the remaining oil of lubricating viscosity, cooling the mixture to a temperature of about 170 to 190° F., adding the wax to the mixture as a melt, adding the remaining oil of lubricating viscosity, and rapidly cooling the temperature down to at least about 120° F.

8. The method of claim 7 wherein the mineral oil of lubricating viscosity has a viscosity from about 50 to 150 SUS at 100° F.

9. A soluble oil composition which consists essentially of a soluble oil, comprising a mineral lubricating oil and emulsifier in emulsifying amounts and selected from the group consisting of sulfonate, naphthenate and oleate, and a gel, said gel consisting essentially of a mineral oil of lubricating viscosity, about 2 to 10 weight percent of a petroleum microcrystalline wax, and about 1 to 10 weight percent of a polymer of ethylene having a molecular weight of about 1500 to 2500, said gel being present in the soluble oil in an amount effective to inhibit foam formation in use.

10. A soluble oil composition which consists essentially of a soluble oil, comprising mineral lubricating oil, emulsifier, coupling agent amounts of a compound selected from the group consisting of glycol ethyl ether, glycol butyl ether and diethylene glycol and secondary emulsifying amounts of a water-soluble metal rosinate secondary emulsifier in emulsifying amounts and selected from the group consisting of sulfonate, naphthenate and oleate, and a gel, said gel consisting essentially of a mineral oil of lubricating viscosity, about 2 to 10 weight percent of a petroleum microcrystalline wax and about 1 to 10 weight percent of a polymer of ethylene having a molecular weight of about 1500 to 2500, said gel being present in the soluble oil in an amount effective to inhibit foam formation in use.

11. The soluble oil composition of claim 10 in which the mineral oil has a viscosity from about 50 to 150 SUS and 100° F.

12. The soluble oil composition of claim 10 in which the microcrystalline wax is derived from paraffin base crude and has a melting point of about 122 to 132° F. and the polymer is a terminal hydroxyl-containing polymer of ethylene.

13. A soluble oil composition according to claim 12 in which said polymer has a molecular weight of about 2000 to 2200.

14. A soluble oil composition which consists essentially of a soluble oil, comprising a mineral lubricating oil, soluble mahogany sulfonate in emulsifying amounts, and a gel, said gel consisting essentially of a mineral oil of lubricating viscosity, about 2 to 10 weight percent of petroleum microcrystalline wax, and about 1 to 10 weight percent of a polymer of ethylene having a molecular weight of about 1500 to 2500, said gel being present in the soluble oil in an amount effective to inhibit foam formation in use.

15. A soluble oil composition which consists essentially of a soluble oil, comprising mineral lubricating oil, soluble sodium mahogany sulfonate in emulsifying amounts, coupling agent amounts of a compound selected from the group consisting of glycol ethyl ether, glycol butyl ether and diethylene glycol, secondary emulsifying amounts of a water-soluble metal rosinate secondary emulsifier, and a gel, said gel consisting essentially of a mineral oil of lubricating viscosity, about 2 to 10 weight percent of petroleum microcrystalline wax and about 1 to 10 weight percent of a polymer of ethylene having a molecular weight of about 1500 to 2500, said gel being present in the soluble oil in an amount effective to inhibit foam formation in use.

16. The soluble oil composition of claim 15 in which the mineral oil has a viscosity from about 50 to 150 SUS at 100° F., the glycol is diethylene glycol, and the metal rosinate is sodium rosinate.

17. The soluble oil composition of claim 16 in which the microcrystalline wax has a melting point of about 122 to 132° F. and the polymer is a terminal hydroxyl-containing polymer of ethylene.

References Cited in the file of this patent

UNITED STATES PATENTS

| 2,340,035 | Zimmer | Jan. 25, 1944 |
| 2,431,008 | Wright | Nov. 18, 1947 |
| 2,445,312 | Cooke | July 20, 1948 |
| 2,545,677 | Sperry | Mar. 20, 1951 |
| 2,762,775 | Foehr | Sept. 11, 1956 |
| 2,820,699 | Morris | Jan. 21, 1958 |

UNITED STATES PATENT OFFICE
CERTIFICATE OF CORRECTION

Patent No. 2,972,578            February 21, 1961

Lawrence A. Roehler

It is hereby certified that error appears in the above numbered patent requiring correction and that the said Letters Patent should read as corrected below.

Column 6, lines 11, 12 and 13, strike out "in emulsifying amounts and selected from the group consisting of sulfonate, naphthenate and oleate" and insert the same after "emulsifier" in line 7, same column 6.

Signed and sealed this 17th day of October 1961.

(SEAL)
Attest:

ERNEST W. SWIDER            DAVID L. LADD
Attesting Officer            Commissioner of Patents

USCOMM-DC